United States Patent

Ikegami et al.

[11] Patent Number: 5,856,673
[45] Date of Patent: Jan. 5, 1999

[54] DEPTH DOSE MEASURING APPARATUS

[75] Inventors: Kazunori Ikegami; Hiroshi Nishizawa; Toshifumi Hayakawa, all of Tokyo, Japan

[73] Assignee: Mitsubishi Denki Kabushiki Kaisha, Tokyo, Japan

[21] Appl. No.: 810,970

[22] Filed: Feb. 27, 1997

[30] Foreign Application Priority Data

Feb. 27, 1996 [JP] Japan .................................. 8-039506

[51] Int. Cl.⁶ ...................................................... G01T 1/20
[52] U.S. Cl. ........................................................ 250/368
[58] Field of Search .................................. 250/368, 367

[56] References Cited

U.S. PATENT DOCUMENTS

| 4,845,769 | 7/1989 | Burstein et al. | 378/58 |
| 5,675,151 | 10/1997 | Oka et al. | 250/368 |

FOREIGN PATENT DOCUMENTS

| 57-76466 | 5/1982 | Japan | 250/368 |
| 63-238584 | 10/1988 | Japan | 250/368 |

OTHER PUBLICATIONS

Takahiko Aoyama et al, "A Scintillating Fiber Depth–Dose Measuring Device for Electron Beam Therapy", published as part of *The Summary of the 33rd Symposium of Isotope Investigation in Science and Technology*, p. 52, 2a–I–4, Jul., 1996.

The Department of Physics in the Japanese Medical Radioactive Rays Academy, "Measuring of Absorbed Dose of $^{60}$Co γ–ray", published by Tsushosangyo Kenkyusha, Ltd. Feb. 28, 1986.

Toyo Medic, Inc., "240–type of CIPS Dose Plotting System by Three–dimensional Computer Control", Sep. 8, 1995.

"Chapter 1 $^{60}$Co Gamma–Ray and high energy X–ray, I. X, γ–ray (the case that SSD is constant)", p. 19 Physics Committee of Japan society of Medical Radiation, published by Trade and Industry Research Co.

*Primary Examiner*—Constantine Hannaher
*Attorney, Agent, or Firm*—Sughrue, Mion, Zinn, Macpeak & Seas, PLLC

[57] ABSTRACT

In a depth dose measuring apparatus, a fluorescent substance block (1) bundling scintillation fibers of which radiation absorption characteristic is close to that of tissue, is disposed orthogonally to the incident direction of radiation (4-1). The fluorescence intensity distribution on the fiber end faces of the fluorescent substance block (1) is measured by an image measuring device (6). Therefore, the two-dimensional fluorescence intensity distribution in the incident direction of radiation and in another orthogonal direction, that is, the absorption dose distribution can be measured simultaneously by one irradiation. Moreover, if the fluorescent substance block (1) is composed by laminating plate-form scintillators, one-dimensional absorption dose distribution in the depth direction can be measured by one operation.

16 Claims, 11 Drawing Sheets

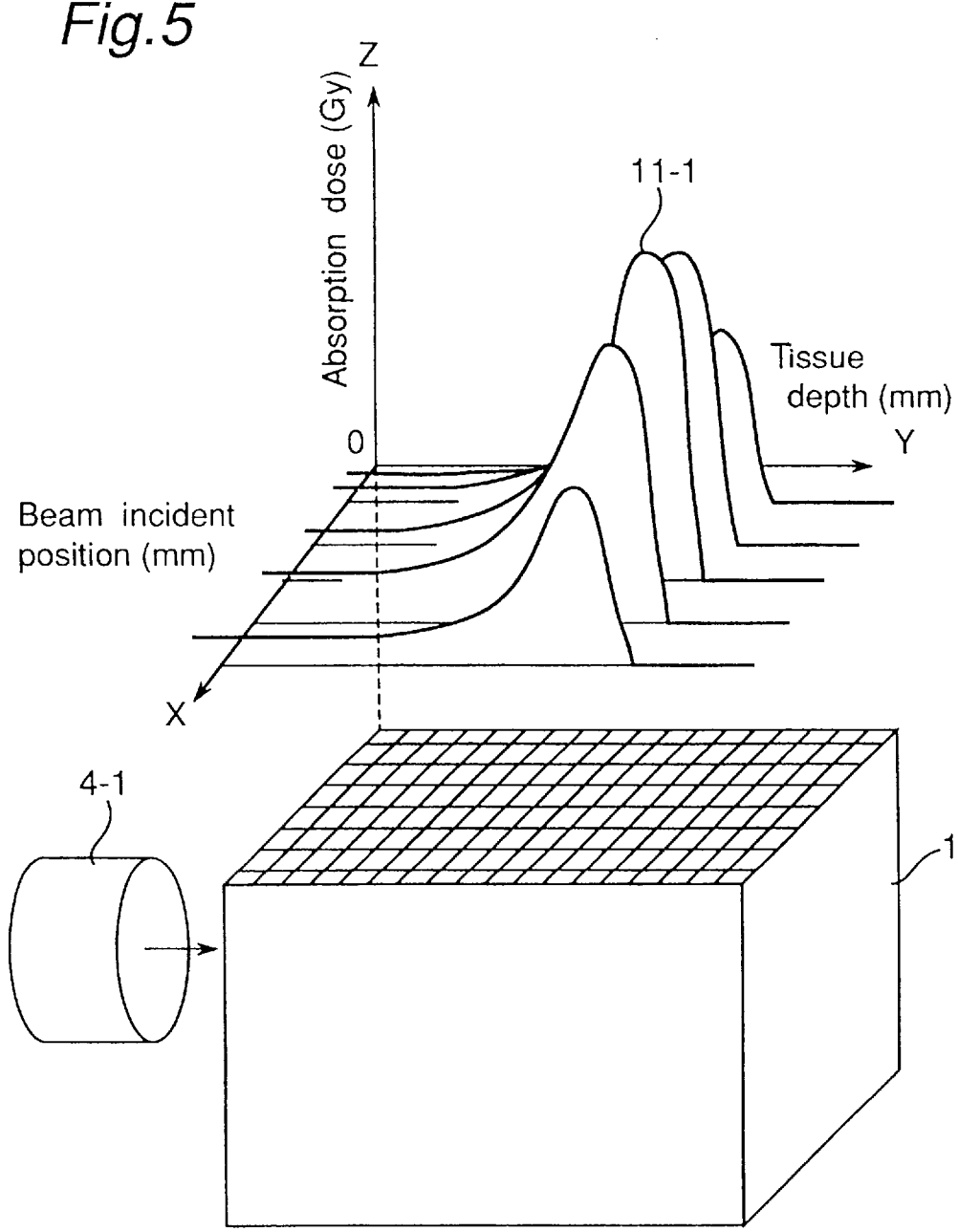

DEPTH DOSE MEASURING APPARATUS

FIELD OF THE INVENTION

The present invention relates to a depth dose measuring apparatus for measuring absorption dose distribution in a human body when the human body is irradiated with radiation, in particular, distribution of absorption dose in depth of the human body. This apparatus is used, for example, in determination of exposure region of irradiation equipment for treatment of cancer.

DESCRIPTION OF THE PRIOR ART

FIG. 16 is a schematic diagram of a conventional depth dose measuring apparatus for Co-60 gamma-ray and high-energy X-ray disclosed, for example, in a publication [Standard measuring method of absorption dose of high-energy X-ray and electron beam in radiotherapy, Chapter 1. $^{60}$Co gamma-ray and high-energy X-ray, p. 19 (ed. Physics Committee of Japan Society of Medical Radiation, published by Trade and Industry Research Co.)], in which reference numeral 24-1 denotes forward water being the tissue equivalence up to the measuring point, and 24-2 represents backward water being the tissue equivalence behind the measuring point. Reference numeral 2-1 indicates an upper container for holding the forward water 24-1, and P1, P2, and P3 represent depths for filling the upper container 2-1, being respectively 5 cm, 7 cm, and 10 cm. Reference numeral 2-2 indicates a lower container for holding the backward water 24-2. Hereupon, Q is 30 cm, and R is 20 cm or more. Reference numeral 3 indicates a measuring hole for inserting an ionization chamber dosimeter, and 4 indicates the axis of heavy ion particles or other radioactive particle beam.

The operation is described below. First, the ionization chamber dosimeter is put into the measuring hole 3, and the lower container 2-2 and upper container 2-1 are filled with water. At this time, the upper container 2-1 is filled with water 24-1 up to the position of the depth dose to be measured first, for example, to the depth of P1 (5 cm) in the diagram. Next, Co-60 gamma-ray or high-energy X-ray is emitted along the beam axis 4. In this state, the absorption dose is measured in the ionization chamber dosimeter inserted in the measuring hole 3.

Then, stopping the beam emission, the amount of water 24-1 in the upper container 2-1 is increased up to the next measuring depth. For example, in the diagram, the water 24-1 is increased to the position of P2 (7 cm). Next, Co-60 gamma-ray or high-energy X-ray is emitted along the beam axis 4. In this state, the absorption dose is measured in the ionization chamber dosimeter inserted in the measuring hole 3. This operation is repeated, and the amount of water 24-1 is increased, and the absorption dose distribution in depth of human body is measured.

In such conventional depth dose measuring apparatus, to measure one absorption dose distribution requires multiple dose measurement. For example, to treat one patient with cancer, it is necessary to adjust the irradiation beam so that the absorption dose distribution may be suited to the shape and dimensions of the cancer tissue subject to irradiation of the patient, and hence it required to measure the absorption dose distribution multiple times by varying the parameter of irradiation beam. It requires, therefore, a tremendous time for determining the parameter of irradiation beam suited to the shape and dimensions of the cancer tissue subject to irradiation.

The invention is devised to solve the above problems, and it is hence an object thereof to present a depth dose distribution measuring apparatus capable of promptly adjusting the irradiation beam according to the shape and dimensions of the tissue under disease of patient with cancer by measuring one absorption dose distribution precisely by one irradiation.

SUMMARY OF THE INVENTION

To solve the above-mentioned problems of the prior art, the invention presents a depth dose measuring apparatus capable of measuring dose distribution in depth of human body by one operation by medical irradiation equipment.

Hereinafter, fundamental conception of the present invention will be described.

A fundamental constitution of the invention presents a depth dose measuring apparatus, in which a fluorescent substance block bundling scintillation fibers having radiation absorption characteristic close to that of tissue is disposed orthogonally to the incident direction of radiation, the fluorescence intensity distribution on the fiber end face of the fluorescent substance block is measured by an image measuring device, and therefore the two-dimensional fluorescence intensity distribution in the incident direction of radiation and in another orthogonal direction, that is, the absorption dose distribution can be measured simultaneously by one irradiation. Moreover, if the fluorescent substance block is composed by laminating plate-form scintillators, one-dimensional absorption dose distribution in the depth direction can be measured by one operation.

Another fundamental constitution of the invention presents a depth dose measuring apparatus, in which the scintillation fibers are alternately laminated orthogonally, and the fluorescence intensity distribution on end faces of two orthogonal fibers is measured by the image measuring apparatus, so that a three-dimensional absorption dose distribution consisting of the incident direction of radiation and two other directions orthogonal thereto can be measured by one operation.

A further fundamental constitution of the invention presents a depth dose measuring apparatus, in which the fluorescent substance block is composed by laminating plate-form scintillators, and the fluorescence intensity of each scintillator layer is measured parallel by individual photo detectors, so that the absorption dose distribution in depth of tissue can be measured by one operation without using image measuring device.

Thus, the depth dose measuring apparatus of the invention emits fluorescence proportional to the absorption dose when heavy ion particles or other particles pass through the laminated plastic scintillator or plastic scintillator fiber. This light emission amount is measured independently in the depth direction, so that the absorption dose distribution in depth of human body can be measured by one incidence of heavy ion particles or other particles.

Hereinafter, more concrete constitutions of the present invention will be described.

According to an aspect of the present invention, there is provided a depth dose measuring apparatus including, a fluorescent substance block formed by bundling scintillation fibers, each of which has radiation absorption characteristic similar to that of tissue of human body, the fluorescent substance block being disposed in such a manner that the direction along which the scintillation fibers extend is orthogonal to an incident direction of radiation, and an image measuring device for measuring fluorescence intensity distribution on fiber end faces of the fluorescent substance block.

In this depth dose distribution measuring apparatus, the two-dimensional distribution of the dose in the depth direction and horizontal direction can be measured by one operation of measurement.

In the above-mentioned depth dose distribution measuring apparatus, the image measuring device may be composed of plural photo detectors, each of which is disposed at a corresponding fiber end face of the fluorescent substance block. In this case, because the end face of the fluorescent substance block is connected directly to the photo detector, the image can be displayed efficiently.

Hereupon, each of the fiber end faces of the fluorescent substance block may be connected to the photo detector corresponding thereto through an optical amplifier. In this case, because the optical amplifier is inserted between the end face of the fiber block and the photo detector, the image can be displayed at high sensitivity.

In the above-mentioned depth dose distribution measuring apparatus, it is preferable that the scintillation fibers of the fluorescent substance block are thermally fused together. In this case, because the scintillation fibers have been heated and fused, the constitution of the block is simple.

In the above-mentioned depth dose distribution measuring apparatus, it is preferable that the scintillation fibers of the fluorescent substance block are alternately laminated orthogonally from a viewpoint of the incident direction of radiation, and each of the fluorescence intensity distributions on the two kind of orthogonal fiber end faces is measured by the image measuring device. In this case, the absorption dose distribution can be measured in three-dimensional distribution of absorption dose, that is, the spread in the depth direction and other two directions, by mutually varying the bundling direction of scintillation fibers, and the absorption dose distribution in the lateral direction and vertical direction of incident beam can be measured simultaneously.

The above-mentioned depth dose distribution measuring apparatus may include an image display device for delivering the absorption dose distribution in two-dimensional distribution, that is, the spread in depth direction and other one direction. In this case, because the absorption dose distribution is displayed in two-dimensional distribution of absorption dose distribution, that is, the spread in depth and other one direction, the distribution of absorption dose of multiple beams can be measured by one operation.

The above-mentioned depth dose distribution measuring apparatus may include a reflector which is disposed at the opposite end face of the end face confronting the image measuring device of the fluorescent substance block. In this case, the luminance of the fluorescent substance can be efficiently utilized in measurement.

According to another aspect of the present invention, there is provided a depth dose measuring apparatus including, a fluorescent substance block formed by laminating plate-form scintillators, each of which has radiation absorption characteristic similar to that of tissue of human body, the fluorescent substance block being disposed in such a manner that spreading surfaces of the plate-form scintillators are orthogonal to an incident direction of radiation, and an image measuring device for measuring fluorescence intensity distribution on plate end faces of the fluorescent substance block.

In this depth dose distribution measuring apparatus, because the fluorescent substance block is composed by laminating plate-form scintillators, the one-dimensional distribution of the dose in the depth direction can be measured by one operation of measurement.

In the above-mentioned depth dose distribution measuring apparatus, the fluorescent substance block may be connected to the image measuring device through optical transmission fibers. In this case, measurement is easy.

In the above-mentioned depth dose distribution measuring apparatus, it is preferable that the image measuring device includes an optical transmission fiber for delay connecting the laminated plate-form scintillators in series, two photo detectors connected at both ends of the optical transmission fiber respectively and a time difference measuring device for measuring the time difference of output pulses of the two photo detectors, and the image measuring device being able to measure the fluorescence intensity distribution on the plate end faces of the fluorescent substance block in accordance with the time difference. In this case, because the multi-layer fluorescent substance is coupled with the optical transmission fiber and the dose distribution in depth of human body is measured by making use of time difference in light detection, the illuminating laminate can be distinguished.

The above-mentioned depth dose distribution measuring apparatus may include a wavelength shift fiber which is disposed around the fluorescent substance. In this case, it is possible to measure at high sensitivity.

Hereupon, the wavelength shift fiber may be coupled with the image measuring device through an optical transmission fiber. In this case, it is possible to measure at high sensitivity even if the image measuring device is apart.

In the above-mentioned depth dose distribution measuring apparatus, it is preferable that the fluorescent substance is in an elliptical shape, and its side face is coated with a reflective material. In this case, all the light emitted near the incident focus can be focused.

Hereupon, this apparatus may include a wavelength shift fiber which is inserted at the position of focal point of the ellipse of the fluorescent substance. In this case, all the light emitted near the incident focus can be focused, and the wavelength conversion fiber weak in resistance to radiation can be installed away from the radiation incident position.

In each of the above-mentioned depth dose distribution measuring apparatuses, it is preferable that the fluorescent substance block is put in a vacuum cell. In this case, the measuring precision can be enhanced.

BRIEF DESCRIPTION OF THE DRAWINGS

These and other objects, features and advantages of the present invention will become clear from the following description taken in conjunction with the preferred embodiments with reference to the accompanying drawings throughout which like parts are designated by like reference numerals, and in which;

FIG. 5 is an explanatory diagram of a depth dose distribution measuring apparatus in a fifth embodiment of the invention;

DETAILED DESCRIPTION OF THE PREFERRED EMBODIMENTS

Figure 1:
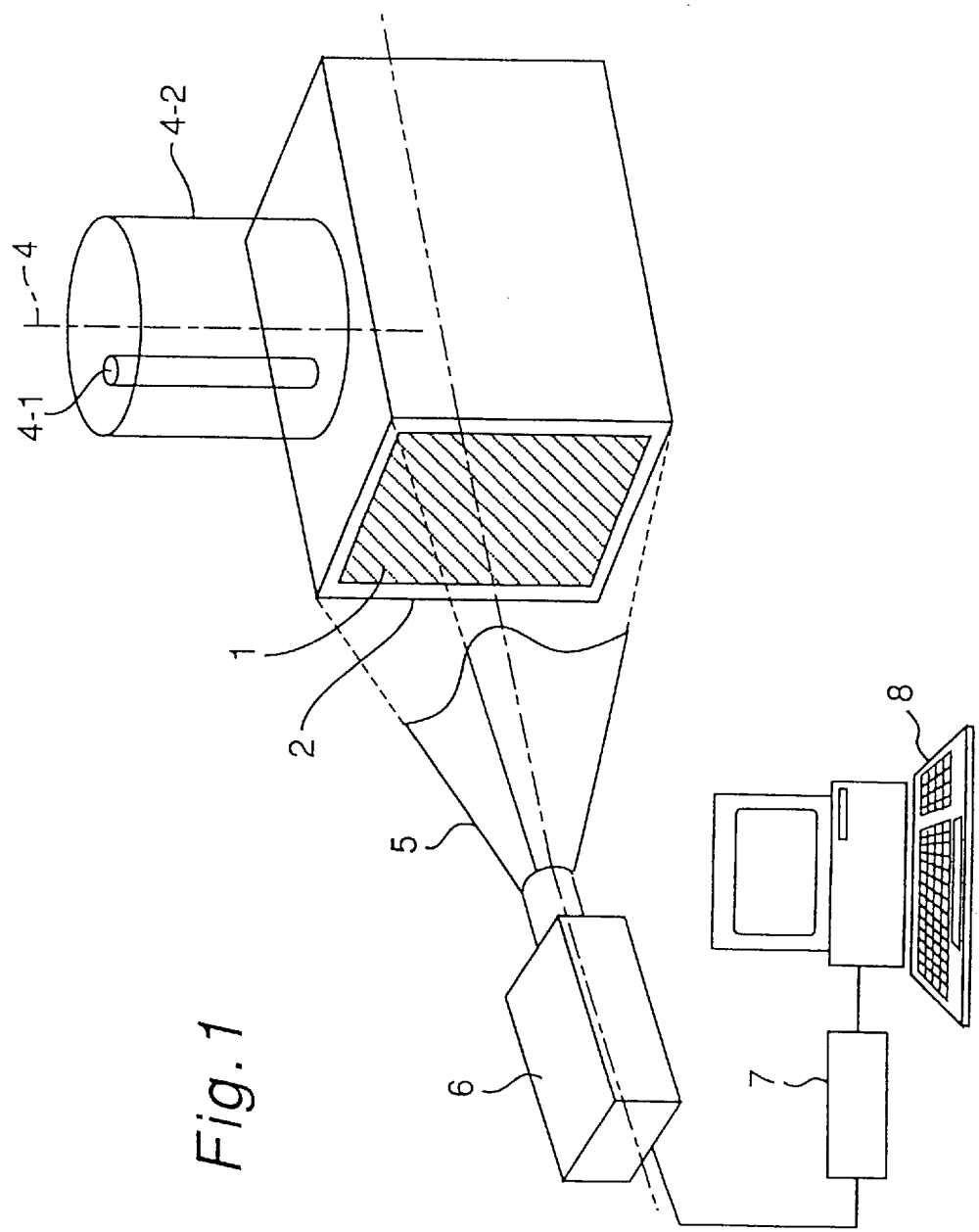
FIG. 1 is a block diagram of a depth dose distribution measuring apparatus in a first embodiment of the invention.

The depth dose distribution measuring apparatus of radiation according to the invention laminates presumably tissue equivalent plastic scintillator or plastic scintillation fiber, measures the light emission amount corresponding to the absorption dose independently in the depth direction, comprises means for independently processing and displaying the measured signal.

(Embodiment 1)

A first embodiment of the present invention will be described below while referring to the drawing.

FIG. 1 is a block diagram of depth dose distribution measuring apparatus in the first embodiment of the invention, in which reference numeral 1 indicates a fluorescent substance (fiber block) for emitting light by irradiation of radioactive particle beam, and it is composed by bundling linear scintillators, and is disposed orthogonally to the incident direction of the radioactive particle beam. The material of the scintillators is required to have the radiation absorption characteristic close to that of the tissue. Such scintillators may include plastic scintillators. Reference numeral 2 indicates a fiber block frame for holding the fluorescent substance, 4 indicates an axis of incidence of heavy ion particles or other radioactive particle beams into the fluorescent substance, 4-1 shows heavy ion particles or other radioactive particle beams, 4-2 indicates an irradiation range of radioactive particle beams, 5 indicates a light shielding tool for cutting off external light which is noise for measurement of image, and 6 indicates an image measuring device for measuring distribution of fluorescence intensity on end face of the fluorescent substance, the device 6 being disposed opposite to the end face in the axial direction of the fluorescent substance block. Reference numeral 7 indicates an image processing device for processing the image measured by the image measuring device, and 8 indicates an image display device for delivering the processing result of the image.

In thus constituted depth dose distribution measuring apparatus, when a heavy ion particle or other radioactive particle beam is emitted to the fluorescent substance 1 in fiber block form bundling scintillation fibers, light is emitted in the fiber block. This light is independently transmitted in each fiber unit to the end face of the fiber block, and the absorption dose rate distribution can be displayed in the image display device through the image measuring device and image processing device.

Therefore, as compared with the conventional depth dose distribution measuring apparatus which required multiple times of measurement while changing the water depth in the water cell equivalent to the human body, two-dimensional distribution in the depth direction and horizontal direction can be measured by one measurement. Herein, the fluorescent substance fiber block is composed by bundling linear scintillators, but also by laminating plate-form scintillators, one-dimensional depth dose distribution in the depth direction can be measured.

(Embodiment 2)

A second embodiment of the present invention will be described below by referring to the drawing.

Figure 2:
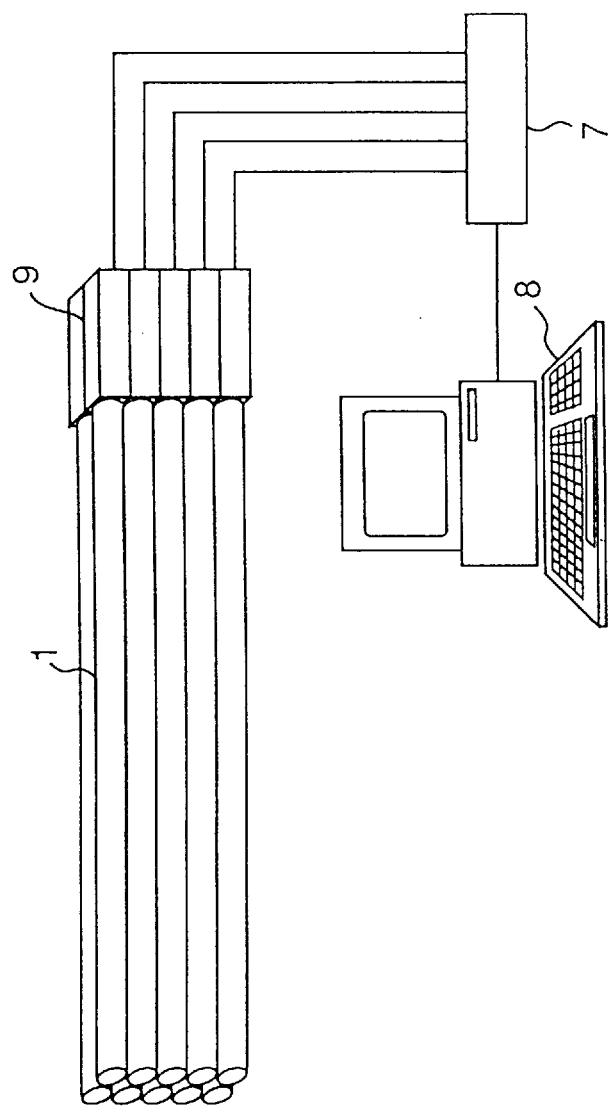
FIG. 2 is an explanatory diagram of a depth dose distribution measuring apparatus in a second embodiment of the invention.

FIG. 2 is an explanatory diagram of the depth dose distribution measuring apparatus in the second embodiment of the invention, in which reference numeral 1 indicates a fluorescent substance (fiber block) which generates light, 9 indicates a photo detector for converting the light emitted from the fluorescent substance into an electric signal, 7 indicates an image processing device for processing the signal of the photo detector, and 8 indicates an image display device for displaying the processing result of the signal.

In thus constituted depth dose distribution measuring apparatus, when a heavy ion particle or other radioactive particle beam enters the fluorescent substance 1 in fiber block form, light is emitted in the fiber block. This light is detected by plural photo detectors 9 disposed on the fiber block end face, and the absorption dose distribution can be displayed in the image display device 8 through the image processing device 7.

(Embodiment 3)

A third embodiment of the present invention will be described below by referring to the drawing.

Figure 3:
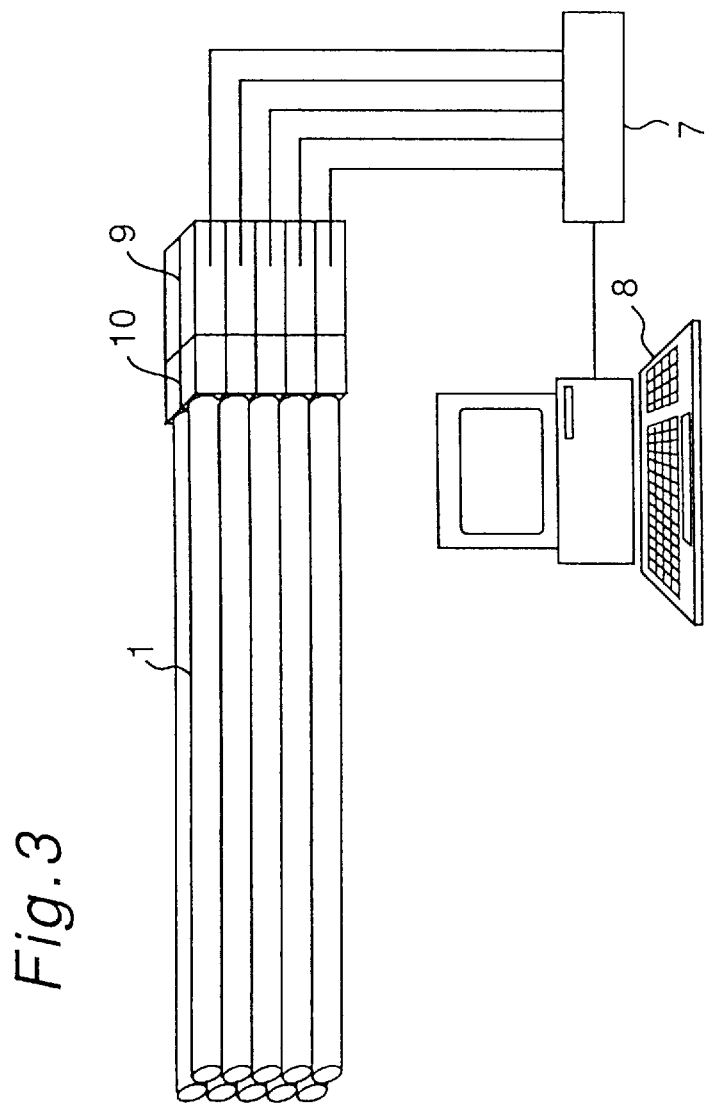
FIG. 3 is an explanatory diagram of a depth dose distribution measuring apparatus in a third embodiment of the invention.

FIG. 3 is an explanatory diagram of the depth dose distribution measuring apparatus in the third embodiment of the invention, in which reference numeral 1 indicates a fluorescent substance (fiber block) which generates light, 10 indicates an optical amplifier for employing the light emitted from the fluorescent substance, 9 indicates a photo detector for converting the optically amplified light into an electric signal, 7 indicates an image processing device for processing the signal of the photo detector, and 8 indicates an image display device for displaying the processing result of the signal.

In thus constituted depth dose distribution measuring apparatus, when a heavy ion particle or other radioactive particle beam enters the fluorescent substance 1 in fiber block form, light is emitted in the fiber block. This light is amplified by the optical amplifier 10 installed independently on the fiber block end face, and the amplified light is detected by the photo detector 9, and the absorption dose distribution can be displayed in the image display device 8 through the image processing device 7.

(Embodiment 4)

A fourth embodiment of the present invention will be described below by referring to the drawing.

Figure 4:
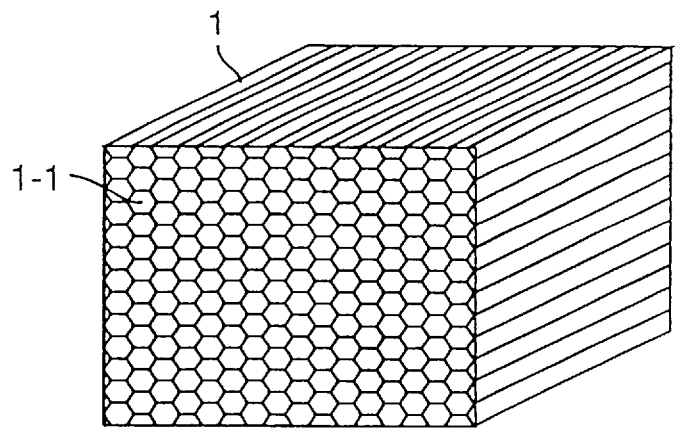
FIG. 4 is an explanatory diagram of a depth dose distribution measuring apparatus in a fourth embodiment of the invention.

FIG. 4 is an explanatory diagram of the depth dose distribution measuring apparatus in the fourth embodiment of the invention, in which reference numeral 1 indicates a fluorescent substance composing a fiber block for emitting light, and 1-1 indicates a scintillation fiber for composing the fluorescent substance 1 by heating and fusing.

In thus constituted depth dose distribution measuring apparatus, multiple scintillation fibers 1-1 are arranged in a rectangular parallelepiped block, and heated, and each one of scintillation fibers is fused, and the fluorescent substance 1 in fiber block form is composed. In this manner, the fiber block frame 2 for holding the fiber block 1 is not needed.

(Embodiment 5)

A fifth embodiment of the present invention will be described below by referring to the drawing.

FIG. 5 is a graph showing the result of measurement for explaining the depth dose distribution measuring apparatus in the fifth embodiment, showing a two-dimensional display of absorption dose distribution, in which the X-axis denotes the beam incident position, the Y-axis indicates the tissue depth, and the Z-axis shows the absorption dose. In this embodiment, a graphic function is added to the image display device 8 in the first to fourth embodiments, and reference numeral 11-1 shows the absorption dose distribution at the incident position.

In thus constituted depth dose distribution measuring apparatus, the absorption dose distribution can be displayed two-dimensionally, so that the distribution of absorption dose at the incident position of multiple beams can be measured at once as a graphic display in the height direction.

(Embodiment 6)

A sixth embodiment of the present invention will be described below by referring to the drawings.

Figure 6:
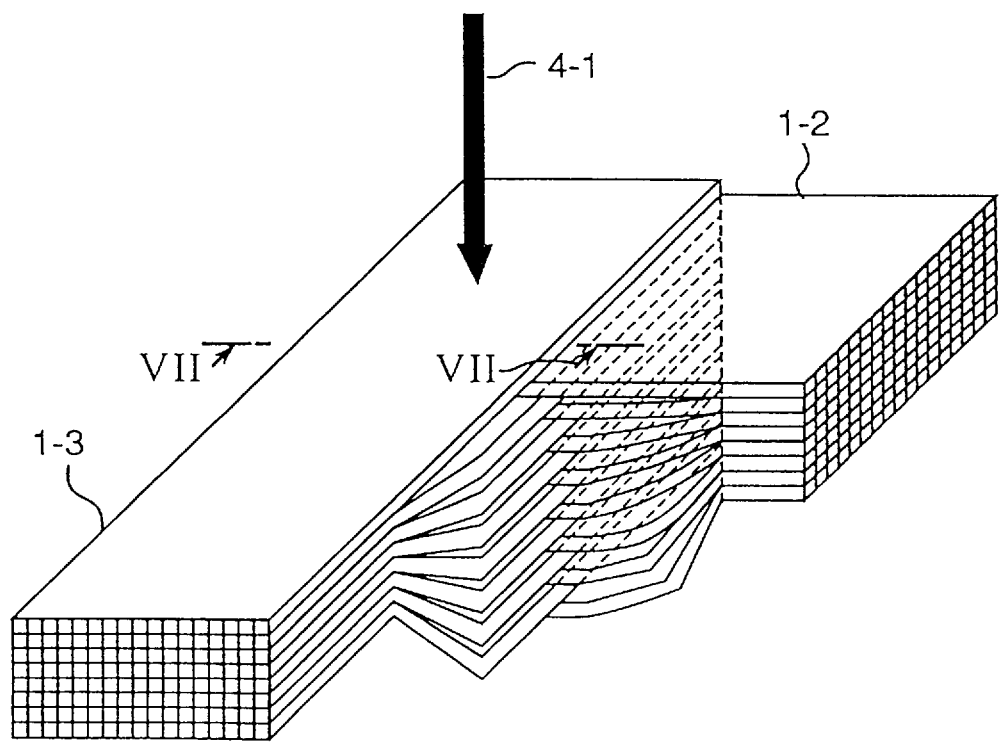
FIG. 6 is an explanatory diagram of a depth dose distribution measuring apparatus in a sixth embodiment of the invention.
Figure 7:
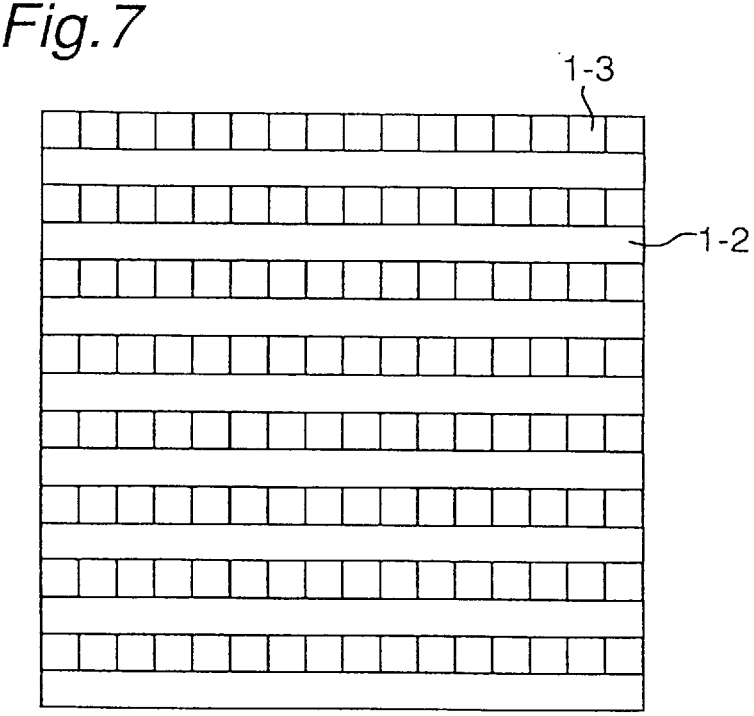
FIG. 7 is an arrow view of section VII—VII in FIG. 6 for explaining the depth dose distribution measuring apparatus in the sixth embodiment of the invention.

FIG. 6 is an explanatory diagram of the depth dose distribution measuring apparatus in the sixth embodiment of the invention, in which reference numeral 1 indicates a fluorescent substance in a fiber block form, 1-2 indicates a scintillation fiber in lateral direction for composing the fluorescent substance 1, 1-3 indicates a scintillation fiber in vertical direction for composing the same, and 4-1 indicates a heavy ion particle or other radioactive particle beam to be entered in the fluorescent substance 1. FIG. 7 is an arrow view of section VII—VII in FIG. 6. Reference numeral 1 indicates the fiber block form, 1-2 indicates a scintillation fiber in lateral direction for composing the fluorescent substance 1, and 1-3 indicates the scintillation fiber in vertical direction for composing the same. Although not shown in the drawing, the image measuring devices are provided on the end faces of the scintillation fiber 1-2, 1-3 in the lateral direction and vertical direction, respectively.

In thus constituted depth dose distribution measuring apparatus, because the lateral direction scintillation fiber 1-2 and vertical direction scintillation fiber 1-3 are alternately laminated by one layer each, the absorption dose distribution in the lateral direction of incident beam and the absorption dose distribution in the vertical direction can be measured simultaneously. That is, the three-directional absorption dose distribution comprising the depth direction which is the radiation incident direction, and other two directions can be measured simultaneously. The directions of the scintillation fibers are vertical and lateral directions herein, but they may be also laminated in more directions.

(Embodiment 7)

A seventh embodiment of the present invention will be described below by referring to the drawing.

Figure 8:
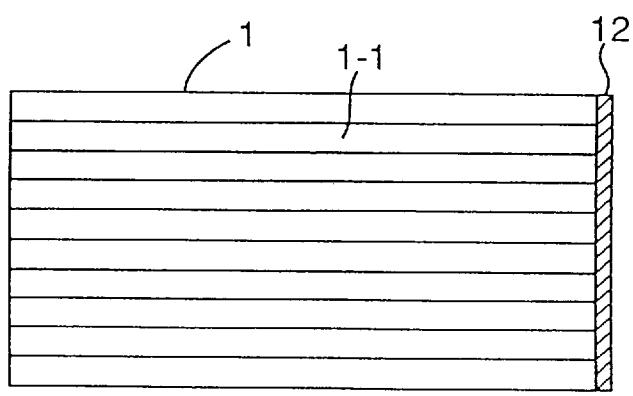
FIG. 8 is an explanatory diagram of a depth dose distribution measuring apparatus in a seventh embodiment of the invention.

FIG. 8 is an explanatory diagram of the depth dose distribution measuring apparatus in the seventh embodiment of the invention, in which reference numeral 1 indicates a fluorescent substance in a fiber block form, 1-1 indicates a scintillation fiber for composing the fluorescent substance 1, and 12 indicates a reflective material for reflecting the light emitted in the scintillation fiber.

In thus constituted depth dose distribution measuring apparatus, one end face of the fluorescent substance 1 forming the scintillation fiber 1-1 in a fiber block form is coated or evaporated with the reflective material 12, and the light emitted in the scintillation fiber 1-1 is reflected and emitted in one direction, so that the light emitted by the scintillation fiber can be completely used in measurement.

(Embodiment 8)

An eighth embodiment of the present invention will be described below by referring to the drawing.

Figure 9:
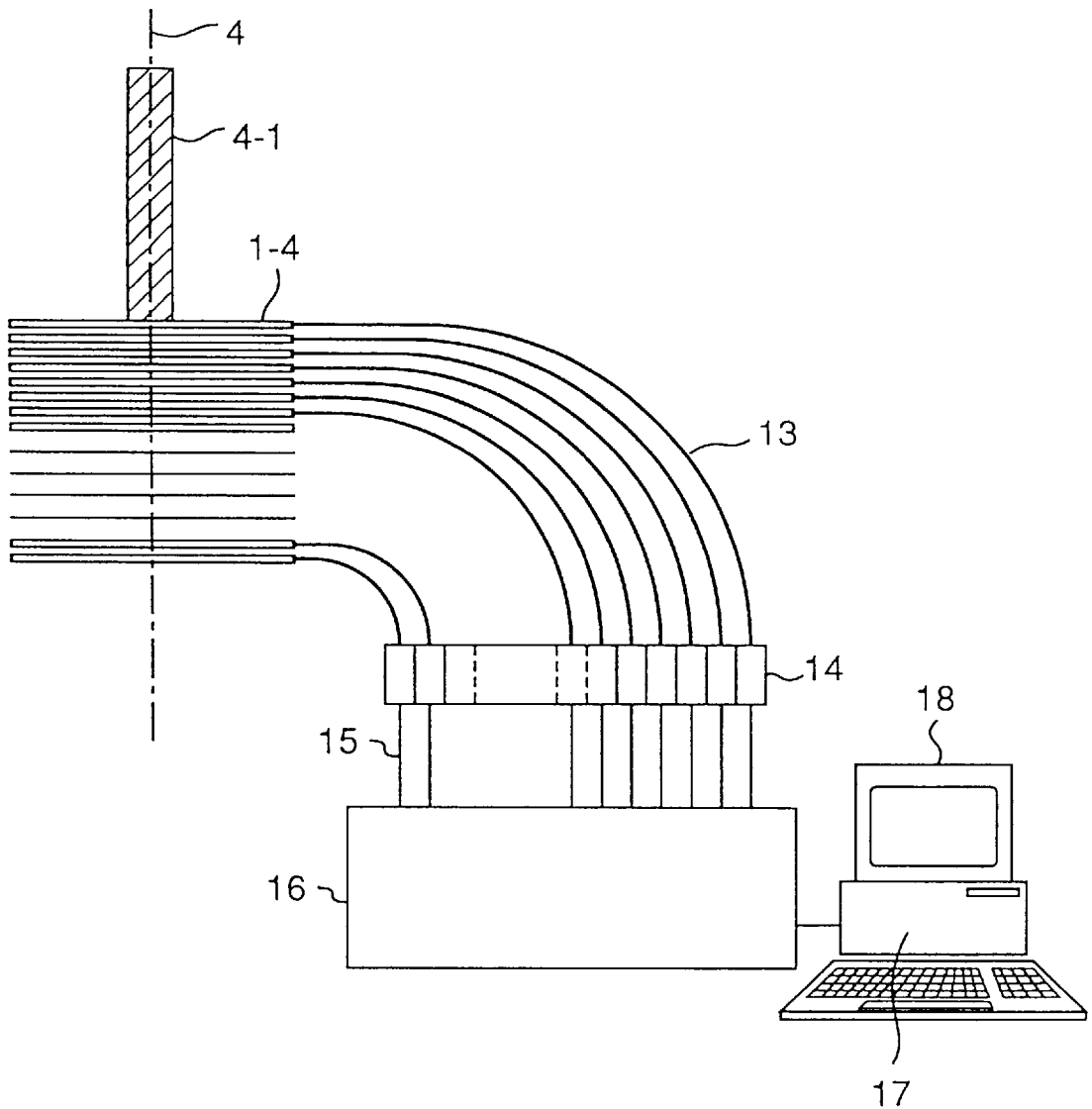
FIG. 9 is an explanatory diagram of a depth dose distribution measuring apparatus in an eighth embodiment of the invention.

FIG. 9 is an explanatory diagram of the depth dose distribution measuring apparatus in the eighth embodiment of the invention, in which reference numeral 1-4 indicates a laminate fluorescent substance for emitting light, 4 indicates an incident axis of heavy ion particle or other radioactive particle beam into a detector, 4-1 indicates a heavy ion particle or other radioactive particle beam, 13 indicates an optical transmission fiber for guiding the light emitted by the laminate fluorescent substance 1-4, 14 indicates a photo detector for converting a light signal into an electrical signal, 15 indicates a signal wire for guiding an electrical signal, 16 indicates a measuring device for measuring an electrical signal, 17 indicates a signal processing device for processing a measured signal, and 18 indicates a display device for displaying the result of measurement.

In thus constituted depth dose distribution measuring apparatus, when a heavy ion particle or other radioactive particle beam 4-1 enters the laminated fluorescent substance 1-4, light is emitted in the laminate fluorescent substance. This light is transmitted to the photo detector through the optical transmission fiber 13 provided independently on the side of the laminate fluorescent substance. The converted electric signal is sent into the measuring device 16 through the signal wire 15, and is processed in the signal processing device 17, and the result of signal processing is displayed in the display device 18.

In this embodiment, not using image measuring device, a simple electronic circuit is used instead, so that it is economical.

(Embodiment 9)

A ninth embodiment of the present invention will be described below by referring to the drawing.

Figure 10:
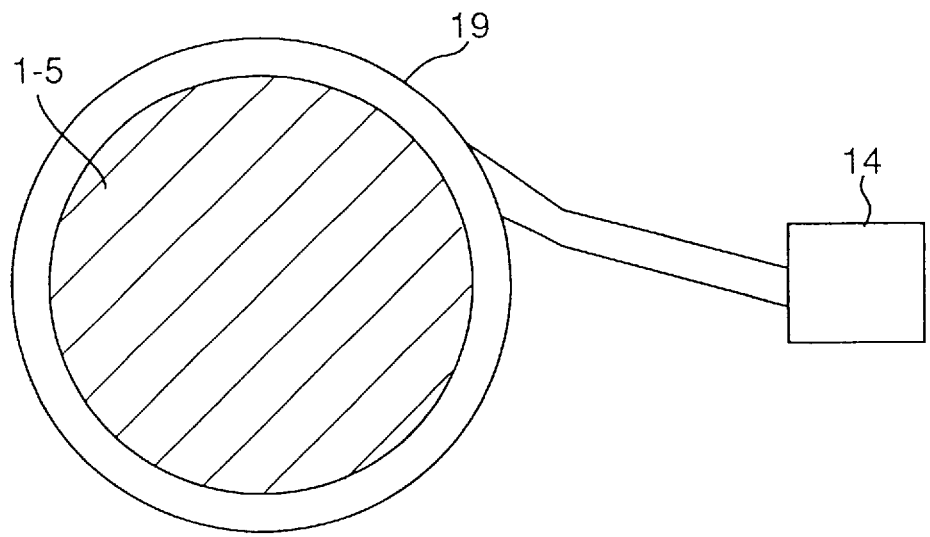
FIG. 10 is an explanatory diagram of a depth dose distribution measuring apparatus in a ninth embodiment of the invention.

FIG. 10 is an explanatory diagram of the depth dose distribution measuring apparatus in the ninth embodiment of the invention, in which reference numeral 1-5 indicates a plate-form fluorescent substance for emitting light, 14 indicates a photo detector for converting a light signal into an electrical signal, and 19 indicates a wavelength conversion fiber for converting the wavelength of the light emitted in the fluorescent substance.

In thus constituted depth dose distribution measuring apparatus, when a heavy ion particle or other radioactive particle beam enters the plate-form fluorescent substance 1-5, light is emitted in the plate-form fluorescent substance. When this light enters the wavelength conversion fiber 19 provided on the side of the plate-form fluorescent substance, a wavelength converted light is emitted at the long wavelength side in the wavelength conversion fiber. This light propagates through the wavelength conversion fiber and is transmitted to the photo detector 14. The wavelength conversion fiber can convert the scintillation luminance into a wavelength of high sensitivity of the photo detector.

(Embodiment 10)

A tenth embodiment of the present invention will be described below by referring to the drawing.

Figure 11:
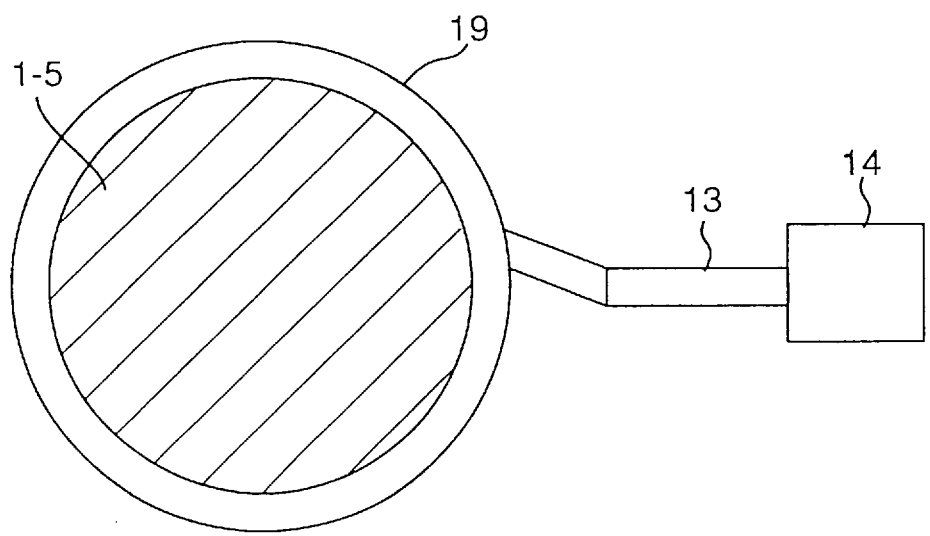
FIG. 11 is an explanatory diagram of a depth dose distribution measuring apparatus in a tenth embodiment of the invention.

FIG. 11 is an explanatory diagram of the depth dose distribution measuring apparatus in the tenth embodiment of the invention, in which reference numeral 1-5 indicates a plate-form fluorescent substance for emitting light, 13 indicates an optical transmission fiber for transmitting a light signal, 14 indicates a photo detector for converting a light signal into an electrical signal, and 19 indicates a wavelength conversion fiber for converting the wavelength of the light emitted in the fluorescent substance.

In thus constituted depth dose distribution measuring apparatus, when a heavy ion particle or other radioactive particle beam enters the plate-form fluorescent substance 1-5, light is emitted in the plate-form fluorescent substance. When this light enters the wavelength conversion fiber 19 provided on the side of the plate-form fluorescent substance, a wavelength converted light is emitted at the long wavelength side in the wavelength conversion fiber. This light propagates through the optical transmission fiber 13 and is transmitted to the photo detector 14.

(Embodiment 11)

An eleventh embodiment of the present invention will be described below by referring to the drawing.

Figure 12:
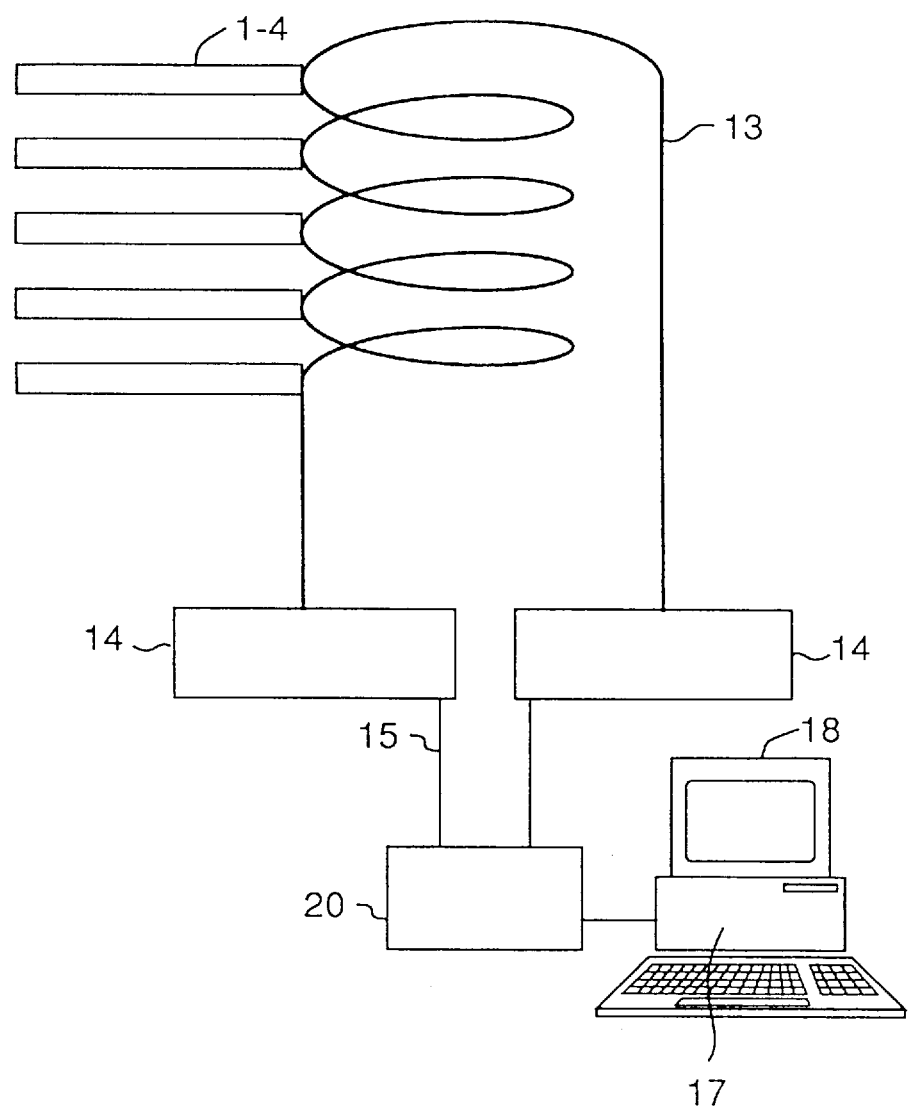
FIG. 12 is an explanatory diagram of a depth dose distribution measuring apparatus in an eleventh embodiment of the invention.

FIG. 12 is an explanatory diagram of the depth dose distribution measuring apparatus in the eleventh embodiment of the invention, in which reference numeral 1-4 indicates a laminate fluorescent substance for emitting light, 13 indicates a delay circuit using an optical transmission fiber for guiding the light emitted by the laminate fluorescent substance 1-4, 14 indicates a photo detector for converting a light signal into an electrical signal, 15 indicates a signal wire for guiding an electrical signal, 20 indicates a time difference measuring device for measuring the time difference of electrical pulses, 17 indicates a signal processing device for processing a measured signal, and 18 indicates a display device for displaying the result of measurement.

In thus constituted depth dose distribution measuring apparatus, when a heavy ion particle or other radioactive particle beam enters the laminated fluorescent substance 1-4, light is emitted in the laminate fluorescent substance. This light is transmitted to the photo detectors at both ends through the delay circuit 13 fitted continuously so as to link each laminate fluorescent substance at the side of the laminate fluorescent substance. The converted electric signal is sent into the time difference measuring device 20 through the signal wire 15, and the time difference of electrical pulses entering from both ends of the delay circuit is measured. By processing the measured time difference in the signal processing device 17, the illuminating laminate fluorescent substance can be distinguished. Moreover, the result of signal processing is displayed in the display device 18.

In this embodiment, not using image measuring device, a simple electronic circuit is used instead, so that it is economical.

(Embodiment 12)

A twelfth embodiment of the present invention will be described below by referring to the drawing.

Figure 13:
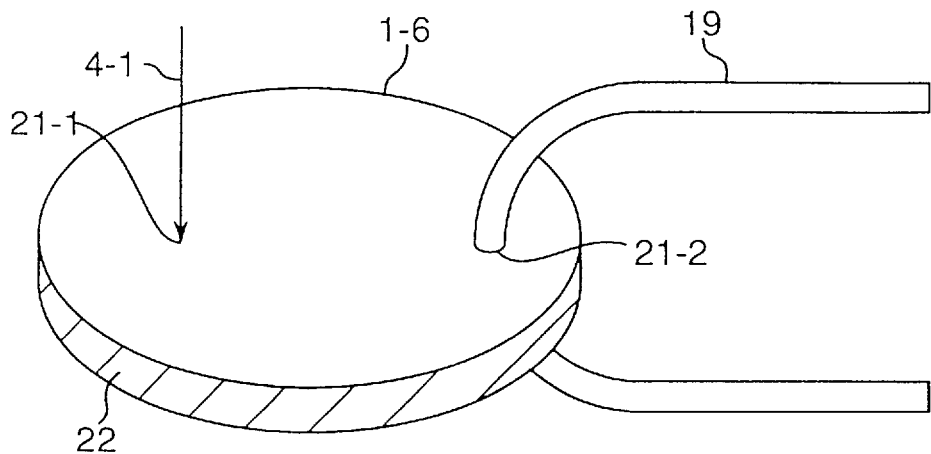
FIG. 13 is an explanatory diagram of a depth dose distribution measuring apparatus in a twelfth embodiment of the invention.

FIG. 13 is an explanatory diagram of the depth dose distribution measuring apparatus in the twelfth embodiment of the invention, in which reference numeral 1-6 indicates an elliptical fluorescent substance for emitting light, 4-1 indicates a heavy ion particle or other radioactive particle beam entering the elliptical fluorescent substance, 19 indicates a wavelength conversion fiber, 21-1 indicates an incident focus showing the focal position on the elliptical fluorescent substance in which the heavy ion particle or other radioactive particle beam enters, 21-2 indicates an exit focus showing the exit position by collecting the light emitted in the elliptical fluorescent substance in the wavelength conversion fiber, and 22 indicates a reflective film for reflecting in order to collect the light emitted in the elliptical fluorescent substance in the focus. The depth dose distribution measuring apparatus of the twelfth embodiment of the invention is composed by laminating the elliptical fluorescent substance shown in FIG. 13.

In thus constituted depth dose distribution measuring apparatus, when a heavy ion particle or other radioactive particle beam 4-1 enters the incident focus 21-1 of the elliptical fluorescent substance 1-6, the light is emitted near the incident focus in the elliptical fluorescent substance. This light is reflected by the reflective film 22 applied on the side of the elliptical fluorescent substance, and is focused on the exit focus 21-2 at the other focal position of the ellipse. By inserting the wavelength conversion fiber 19 in the exit focal position, all the light emitted near the incident focus of the elliptical fluorescent substance is focused, and the wavelength is converted to be transmitted along the wavelength conversion fiber. Meanwhile, the wavelength conversion fiber which is weak in resistance to radioactivity may be disposed away from the radiation incident position.

(Embodiment 13)

A thirteenth embodiment of the present invention will be described below by referring to the drawing.

Figure 14:
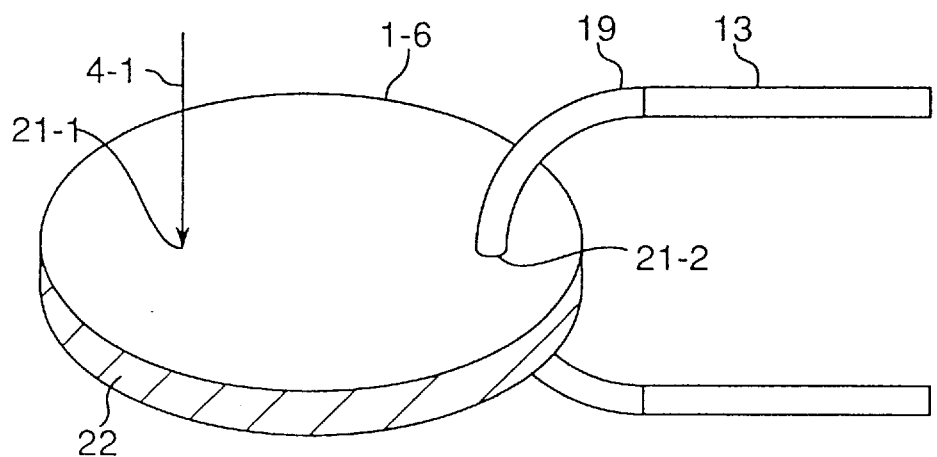
FIG. 14 is an explanatory diagram of a depth dose distribution measuring apparatus in a thirteenth embodiment of the invention.

FIG. 14 is an explanatory diagram of the depth dose distribution measuring apparatus in the thirteenth embodiment of the invention, in which reference numeral 1-6 indicates an elliptical fluorescent substance for emitting light, 4-1 indicates a heavy ion particle or other radioactive particle beam entering the elliptical fluorescent substance, 13 indicates an optical transmission fiber for transmitting light, 19 indicates a wavelength conversion fiber, 21-1 indicates an incident focus showing the focal position on the elliptical fluorescent substance in which the heavy ion particle or other radioactive particle beam enters, 21-2 indicates an exit focus showing the exit position by collecting the light emitted in the elliptical fluorescent substance in the wavelength conversion fiber, and 22 indicates a reflective film for reflecting in order to collect the light emitted in the elliptical fluorescent substance in the focus.

In thus constituted depth dose distribution measuring apparatus, when a heavy ion particle or other radioactive particle beam 4-1 enters the incident focus 21-1 of the elliptical fluorescent substance 1-6, the light is emitted near the incident focus in the elliptical fluorescent substance. This light is reflected by the reflective film 22 applied on the side of the elliptical fluorescent substance, and is focused on the exit focus 21-2 at the other focal position of the ellipse. By inserting the wavelength conversion fiber 19 in the exit focal position, the light emitted in the elliptical fluorescent substance is focused, and the wavelength is converted to be transmitted along the optical transmission fiber 13 connected to the wavelength conversion fiber.

(Embodiment 14)

Figure 15:
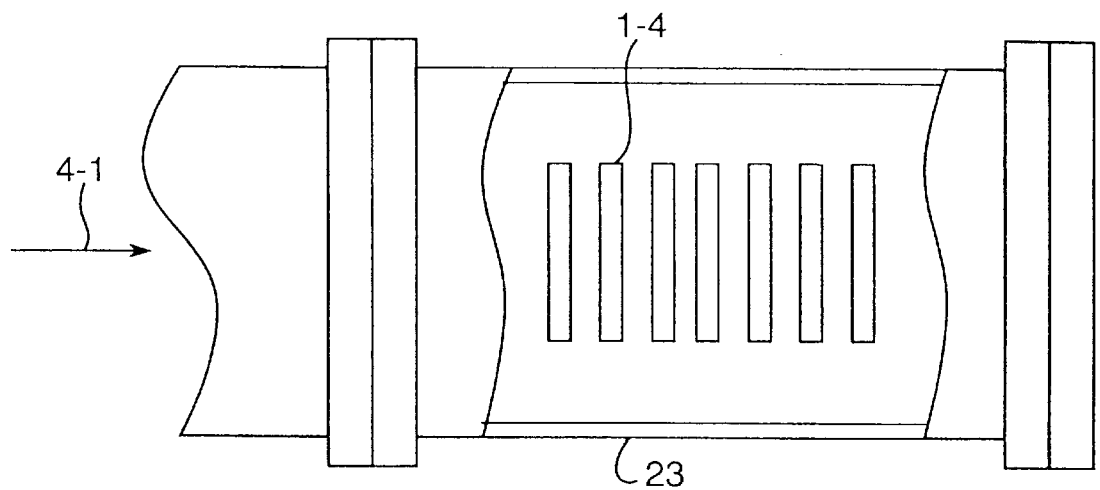
FIG. 15 is an explanatory diagram of a depth dose distribution measuring apparatus in a fourteenth embodiment of the invention.
Figure 16:
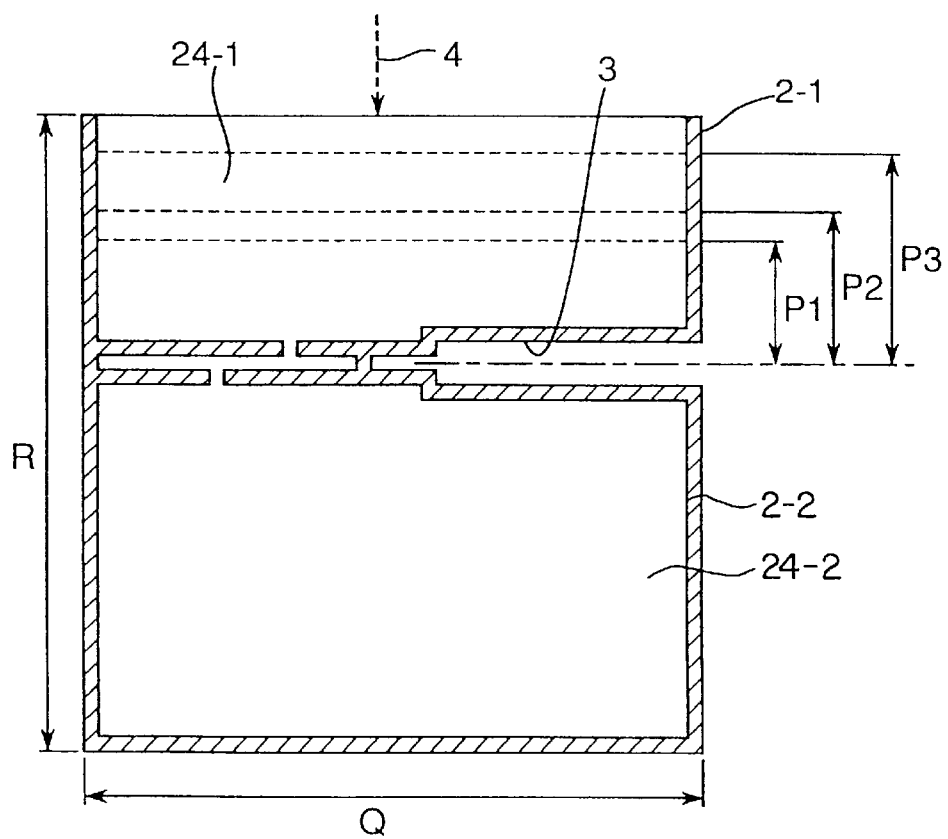
FIG. 16 is a schematic diagram showing a conventional depth dose distribution measuring apparatus.

Below will be described embodiment 14 of the present invention by referring to the drawing. FIG. 15 is a partial sectional view showing this embodiment of the invention.

FIG. 15 is an explanatory diagram of the depth dose distribution measuring apparatus of the fourteenth embodiment of the invention, in which reference numeral 1-4 indicates a laminate fluorescent substance for emitting light, 4-1 indicates a heavy ion particle or other radioactive particle beam, and 23 indicates a vacuum cell in which the laminate fluorescent substance is installed.

In thus constituted depth dose distribution measuring apparatus, when a heavy ion particle or other radioactive particle beam 4-1 enters the laminate fluorescent substance 1-4, light is emitted in the laminate fluorescent substance. Since the laminate fluorescent substance is put in the vacuum cell, almost no air is present in the space among individual laminate fluorescent substances. Accordingly, the incident heavy ion particle or other radioactive particle beam is hardly attenuated in energy among the laminate fluorescent substances, and passes through the laminate fluorescent substances, so that the measuring precision of depth dose may be enhanced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A depth dose measuring apparatus comprising:
   a fluorescent substance block formed by bundling scintillation fibers, each of which has radiation absorption characteristic similar to that of tissue of human body, said fluorescent substance block being disposed in such a manner that the direction along which said scintillation fibers extend is orthogonal to an incident direction of radiation; and
   an image measuring device for measuring fluorescence intensity distribution on fiber end faces of said fluorescent substance block.

2. The depth dose measuring apparatus of claim 1, wherein said image measuring device is composed of plural photo detectors, each of which is disposed at a corresponding fiber end face of said fluorescent substance block.

3. The depth dose measuring apparatus of claim 2, wherein each of the fiber end faces of said fluorescent substance block is connected to the photo detector corresponding thereto through an optical amplifier.

4. The depth dose measuring apparatus of claim 1, wherein said scintillation fibers of said fluorescent substance block are thermally fused together.

5. The depth dose measuring apparatus of claim 1, wherein said scintillation fibers of said fluorescent substance block are alternately laminated orthogonally from a viewpoint of the incident direction of radiation, and the fluorescence intensity distribution on each two end faces of said alternately laminated orthogonal fibers is measured by said image measuring device.

6. The depth dose measuring apparatus of claim 1, further comprising an image display device for delivering the absorption dose distribution in two-dimensional distribution, that is, the spread in depth direction and other one direction.

7. The depth dose measuring apparatus of claim 1, further comprising a reflector which is disposed at the opposite end face of the end face confronting the image measuring device of said fluorescent substance block.

8. The depth dose measuring apparatus of claim 1, wherein said fluorescent substance block is put in a vacuum cell.

9. A depth dose measuring apparatus comprising:
   a fluorescent substance block formed by laminating plate-form scintillators, each of which has radiation absorption characteristic similar to that of tissue of human body, said fluorescent substance block being disposed in such a manner that spreading surfaces of said plate-form scintillators are orthogonal to an incident direction of radiation; and
   an image measuring device for measuring fluorescence intensity distribution on plate end faces of said fluorescent substance block.

10. The depth dose measuring apparatus of claim 9, wherein said fluorescent substance block is connected to said image measuring device through optical transmission fibers.

11. The depth dose measuring apparatus of claim 9, wherein said image measuring device includes an optical transmission fiber for delay connecting said laminated plate-form scintillators in series, two photo detectors connected at both ends of said optical transmission fiber respectively and a time difference measuring device for measuring the time difference of output pulses of the two photo detectors, and said image measuring device being able to measure the fluorescence intensity distribution on the plate end faces of said fluorescent substance block in accordance with said time difference.

12. The depth dose measuring apparatus of claim 9, further comprising a wavelength shift fiber which is disposed around the fluorescent substance.

13. The depth dose measuring apparatus of claim 12, wherein said wavelength shift fiber is coupled with said image measuring device through an optical transmission fiber.

14. The depth dose measuring apparatus of claim 9, wherein said fluorescent substance is in an elliptical shape, and its side face is coated with a reflective material.

15. The depth dose measuring apparatus of claim 14, further comprising a wavelength shift fiber which is inserted at the position of focal point of the ellipse of the fluorescent substance.

16. The depth dose measuring apparatus of claim 9, wherein said-fluorescent substance block is put in a vacuum cell.

* * * * *